Feb. 10, 1959     F. M. METRAILER     2,873,131
SPRING METAL MOUNTING CLUTCH
Filed June 15, 1954
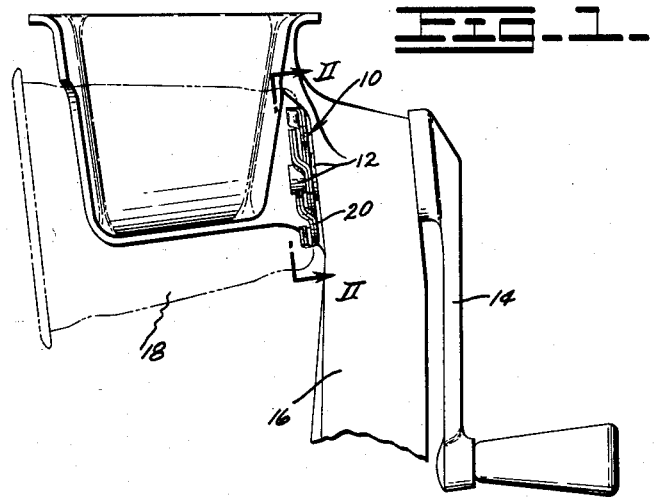
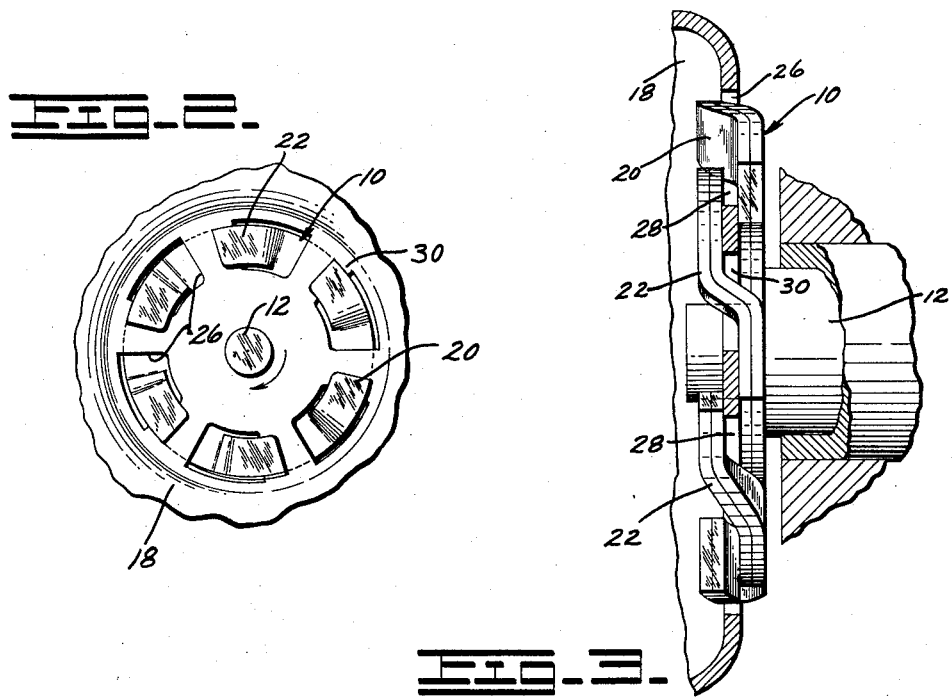
INVENTOR
*Francis M. Metrailer*
BY
ATTORNEY

United States Patent Office 2,873,131
Patented Feb. 10, 1959

2,873,131
SPRING METAL MOUNTING CLUTCH

Francis M. Metrailer, Fort Wayne, Ind., assignor to Kitchen-Quip, Inc., Waterloo, Ind., a corporation of Indiana Application June 15, 1954, Serial No. 436,871

2 Claims. (Cl. 287—103)

This invention relates to spring metal mounting clutches and in particular to clutches employed to rotatably mount the hollow sheet metal cutter and slicer bodies of kitchen utensils employed for slicing and cutting articles of food as disclosed in Patent No. 2,596,604, issued May 13, 1952.

In connection with said utensils it is desired that the cutter and slicer body should be capable of being positively rotated for one direction of rotation of the operating handle and that the body should be prevented from premature or unintentional displacement from its clutched driving position. Where, as disclosed in said prior patent, the ears of the driver part are formed of rigid metal it has been found that this does not compensate for variations in thickness of the metal of the cone part having the slots within which the ears engage, with the result that constant engagement is not effected and there is a tendency for the cutter to spring loose from engagement with said ears. Further, in the absence of such compensation there is a tendency for the rotative force to be concentrated at one or more of the ears, with attendant weakening or fracture of the metal.

It is an object of the invention to provide an improved clutch construction which is self adjustable to varying thicknesses of metal and which will afford an efficient gripping action for varying conditions of operation.

Further objects and advantages of the invention will appear clear from consideration of the following description with reference to the drawings and from the appended claims:

In the drawings:

Fig. 1 is a side elevational view of a clutch constructed according to the invention shown applied to a food cutter and slicer, equipped with a cone cutter, shown in phantom, Fig. 2 is an enlarged face view of the clutch looking in the direction of the arrows II—II in Fig. 1, and Fig. 3 is an enlarged vertical section of Fig. 2.

In the drawings, the clutch is indicated by the general reference 10 and is shown mounted upon a driver shaft 12, which in this instance is a shaft capable of being rotated by the handle 14 of a food cutter and slicer supported by the leg structure 16 and having conical shape hollow cutter and slicer 18.

The clutch is formed by disc 20 fixedly mounted upon shaft 12 for rotation therewith and formed of spring steel to provide a circumferentially spaced series of peripheral ears 22 which are capable of having spring driving engagement with the cutter part 18 by the ears being engaged within slots 26 in the cutter part.

The ears 22 are bent out from the plane of the central disc portion, as seen clearly in Fig. 3, to define in effect slots 28 into which the leading portions 30 of said slots enter into driving engagement behind the ears 22 by rotation of the driver disc 20 in the direction indicated by the arrow in Fig. 2.

According to the invention, in order to ensure that the ears 22 maintain positive driving engagement with said leading portions 30 and provide self compensation for such variations in thickness of the metal of the cutter part as may occur in practise the driver disc 20 is, as stated, formed from spring steel and is shown as being of laminated construction, whereby the employment of thin spring steel is contemplated, with the laminated construction offering sufficient rigidity for driving the cone part yet enabling the ears 22 to maintain a relatively resilient grip upon the metal of the said leading portions 30. Such grip provides compensation for such varying thicknesses of said metal as may occur in practise, especially when the cone part 18, as is usual, is deep drawn to shape, and permits the ears to hold onto the portions 30 against premature or unintentional release when rotation of the shaft 12 is stopped, or due to inertia resulting from sudden stopping thereof.

Having thus disclosed my invention what I claim as novel and wish to secure by Letters Patent is as follows:

1. In a food cutting and slicing machine having a cutting cone of relatively thin deep drawn metal construction with a flat end wall having a series of circumferentially spaced openings radially spaced wiith respect to the axis of said cone, the combination with a driving and clutch member in the form of a flat disc of spring metal having driving and clutching ears integrally formed from and disposed out of the general flat plane of said disc slightly less than the thickness of said end wall, said ears corresponding in spacing to said series of openings and shaped to be inserted into said series of openings upon relative axial movement between said end wall and said disc, said flat end wall abutting said flat disc with said ears disposed in said series of openings, upon relative rotation between said end wall and said disc, portions of said wall adjacent said openings being engaged upon one side of said wall by flat portions of said disc and upon the other side by said ears to clamp said wall and disc together with spring pressure.

2. In a food cutting and slicing machine as defined in claim 1 wherein said disc and integral ears are formed of laminated spring metal construction.

References Cited in the file of this patent
UNITED STATES PATENTS

| | | |
|---|---|---|
| 2,078,781 | Sprenger et al. | Apr. 27, 1937 |
| 2,400,818 | Gallagher | May 21, 1946 |
| 2,472,586 | Harvey | June 7, 1949 |
| 2,496,928 | Bing et al. | Feb. 7, 1950 |
| 2,596,604 | Schaeffer | May 13, 1952 |